United States Patent [19]

Farina

[11] 4,145,685

[45] Mar. 20, 1979

[54] IMAGE DISPLAY DEVICES

[75] Inventor: Attilio Farina, Turin, Italy

[73] Assignee: Indesit Industria Elettrodomestici Italiana S.p.A., Turin, Italy

[21] Appl. No.: 823,240

[22] Filed: Aug. 9, 1977

[51] Int. Cl.² .............................................. H01J 17/48
[52] U.S. Cl. .................................. 340/782; 315/169.3; 340/166 EL; 358/241; 340/798
[58] Field of Search .................................. 358/59, 241; 315/169 TV; 340/166 EL, 324 M

[56] References Cited

U.S. PATENT DOCUMENTS

| | | | |
|---|---|---|---|
| 3,096,516 | 7/1963 | Pendelton et al. | 340/166 EL |
| 3,263,028 | 7/1966 | Shanafelt et al. | 340/324 M |
| 3,513,258 | 5/1970 | Rackman | 358/241 |
| 3,674,928 | 7/1972 | Yoshiyama et al. | 358/241 |
| 3,696,393 | 10/1972 | McDonald | 340/324 R |
| 3,716,658 | 2/1973 | Rackman | 358/241 |
| 3,765,011 | 10/1973 | Sawyer et al. | 340/324 M |
| 3,866,209 | 2/1975 | Weimer | 358/241 X |

*Primary Examiner*—David L. Trafton
*Attorney, Agent, or Firm*—Ladas, Parry, Von Gehr, Goldsmith & Deschamps

[57] ABSTRACT

An image display device comprising a plurality of elements which can be made luminous is described. The elements are arranged in a matrix formed by rows and columns, and each column of the matrix is piloted by as many outputs of a delay line of the charge displacement type, fed by a video signal representative, for lines, of the image to be reproduced and by a clock signal. The main feature of the device is that the delay of the line is substantially equal to the effective duration of information in one line of the video signal, and that there are provided means for interrupting the passage of the clock signal to the delay line during a substantial period of time within the line blanking interval of the video signal, so that during the said period the status of the charges in the delay line remains unchanged, and said status is utilized to render luminous a row of the elements.

10 Claims, 2 Drawing Figures

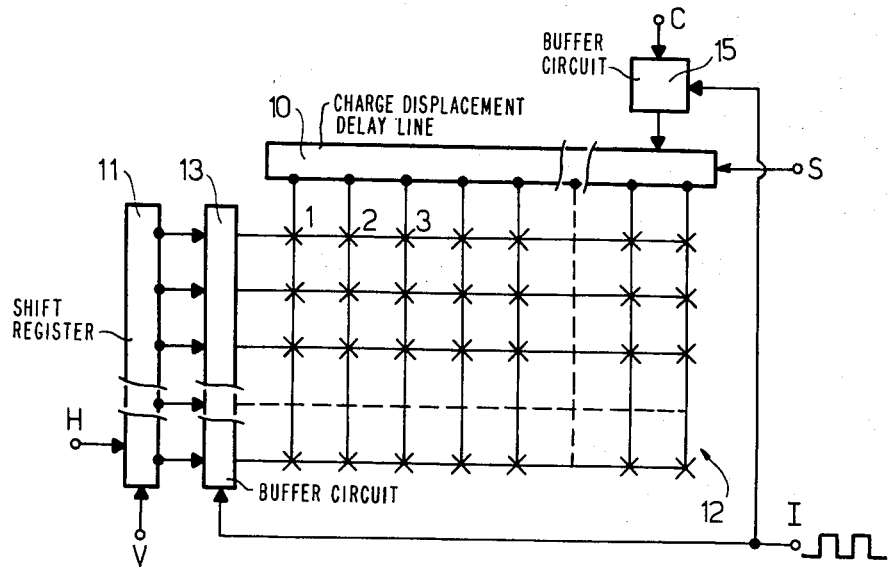

IMAGE DISPLAY DEVICES

BACKGROUND OF THE INVENTION

The present invention relates to an image display device, in particular a television image display device, comprising a screen of known type having a plurality of elements which are arranged in a matrix formed by rows and columns and are rendered luminous as a function of control signals.

In particular, the device according to the present invention is of the type in which each column is connected to as many outputs of a delay line of the charge displacement type, fed by a video signal representative of the image to be reproduced and by a clock signal, and whose delay is at least equal to the effective duration of information in one line of said video signal.

Display devices of this type are being considered in numerous laboratories because they present the big advantage of having much smaller overall dimensions as compared to those of the conventional cathode ray tube system.

However, such devices give rise to a plurality of practical problems, one of which concerns the matrix pilot circuits; surffice it to consider the remarkable number of elements (over 100,000) required by said matrix to provide an acceptable definition.

Therefore, to pilot such matrix elements with the correct portion of effective information of the video signal received, various systems have been used, for instance by utilizing circuits including a delay line fed by the video signal received, and whose outputs are connected to the columns of the matrix (see, for example, the U.S. Pat. Nos. 3,513,258 and 3,716,658), or circuits including memory elements of the various video signal portions which have to be supplied to the columns of the matrix (see, for instance, U.S. Pat. No. 3,765,011).

Since the circuits of said second type are generally more complex, sometimes also as regards the control circuits for changing-over the signals to the rows of the matrix (see, for instance, the U.S. Pat. No. 3,696,393), the present invention is directed to improving the circuits of the first type.

In fact, the devices of the U.S. Pat. Nos. 3,513,258 and 3,716,658 require the use of a delay line having a duration equal to the whole duration of a line of the signal received, and since the content of said line is correct for piloting the columns of the matrix only at a brief instant, the operation of the device is rather critical and the screen is activated only for a brief instant at each row.

SUMMARY OF THE INVENTION

It is an object of the present invention to provide a device of the type described hereinabove, which will simplify the matrix piloting problems and obviate the disadvantages of the prior art devices.

Therefore, the subject of the present invention is an image display device comprising a plurality of elements which can be made luminous, arranged in a matrix formed by rows and columns, in which each column of the matrix is piloted by as many outputs of a delay line of the charge displacement type, fed by a video signal representative, for lines, of the image to be reproduced and by a clock signal, the delay of said line being substantially equal to the effective duraton of information in one line of said video signal, and there being provided means for interrupting the passage of the clock signal to said delay line during a substantial period of time within the line blanking interval of the said video signal, so that during said period the status of the charges in said delay line remains unchanged, said status being utilized to render luminous a row of said elements.

BRIEF DESCRIPTION OF THE DRAWINGS

The invention will now be described in detail with reference to the accompanying drawings given by way of non-limiting examples and in which.

DETAILED DESCRIPTION OF THE INVENTION

Figure 1:
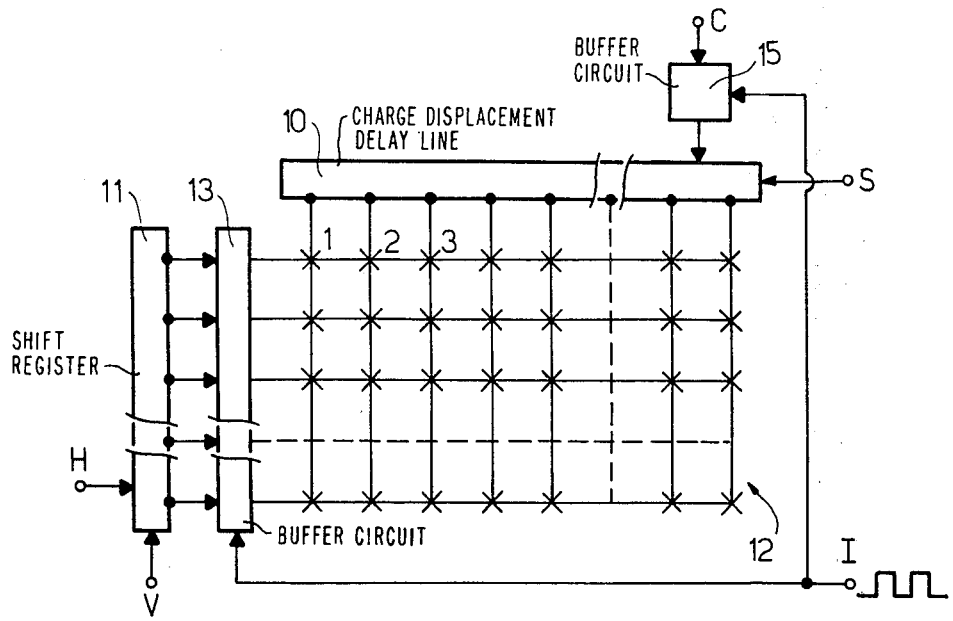
FIG. 1 is a diagrammatical representation of a first image display device according to the present invention.

In FIG. 1 there are shown:
an analogue delay line 10 of the charge displacement or Bucket Brigade device type;
a shift register 11;
a wire matrix 12 of known type, to the intersections of which, marked with a cross in the Figure, there are connected electroluminescent elements or devices (e.g. LED light-emitting diodes) three of which are marked 1, 2 and 3.

The columns of the matrix are connected to as many outputs of the delay line 10, whilst the rows are connected to as many outputs of the register 11 by means of a device 13 which is a change-over or buffer circuit formed, for example, by an many logic AND gates as there are outputs on the shift register 11.

Delay line 10 receives a video signal S representative for lines of the image to be reproduced and a clock signal C by means of a change-over or buffer circuit 15.

Shift register 11 receives, in turn, a clock signal H at line repetition frequency and a signal V represented by a pulse which is repeated at vertical scanning frequency and has a duration of one scanning line of the video signal S (e.g. 64 μsec.) or less.

Buffers 13 and 15 receive control pulses I which are repeated at line frequency and have such a duration (e.g. 8–12 μsec.) and phase that they fall within the blanking or line return interval of the video signal S.

The device shown in FIG. 1 operates as follows:

Let us suppose, for example, that the matrix 12 has 312 × 416 intersections (that is, that delay line 10 has 416 outputs and shift register 11 has 312 outputs), that the frequency of the clock signal H is 15625 Hz and that the frequency of the clock signal C is 8 MHz.

Delay line 10 is charged with an information line in $(416/8.10^6) = 52$ μsec.

Then, pulse I arrives at the buffer 15, and line 10, which no longer receives the clock signal, maintains unchanged its content; at the same time, through buffer 13 which also receives the pulse I, a row of elements of the matrix 12 is enabled to light up, each in proportion to the signal present at the relative output of the delay line 10.

Once pulse I is over (for example, 12 μsec. later), the elements of the matrix 10 extinguish and line 10 begins again receiving information. At the same time, shift register 11 pushes pulse V forward by one line by means of clock signal H.

A second pulse I arrives 64 μsec. after the first one, i.e. when delay line has been charged with the information of a subsequent line; therefore, this information is displayed by the subsequent row of elements of the matrix 12, and so on, and in this way takes place the whole successive scanning by rows of the matrix.

The image display device of the present invention allows providing particularly simple circuits for piloting the matrix. Moreover, since it is provided with a delay line having a duration equal to the effective duration of information in one line of the video signal, the content of the delay line is correct for piloting the columns of the matrix for the whole duration of the line blanking interval of the video signal, and the screen can be activated, in a simple manner, for the whole duration of said interval. Therefore, the operation of the pilot circuits of the device of the present invention is much less critical than that of the prior art devices.

Figure 2:
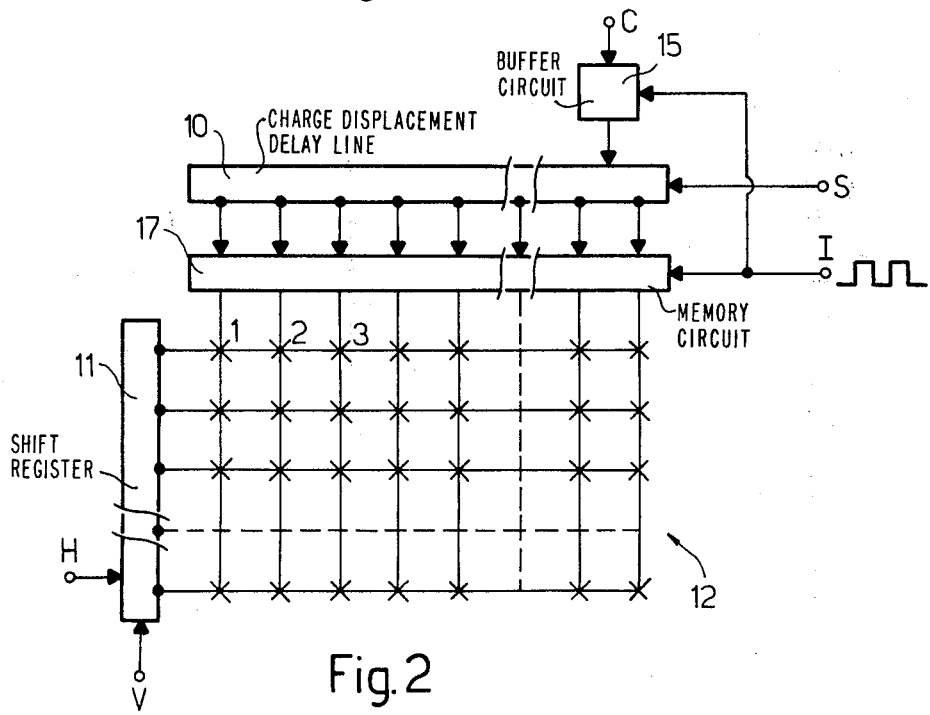
FIG. 2 is a diagrammatical representation of a second image display device according to the present invention.

The device shown in FIG. 2 is similar to the one shown in FIG. 1. The only difference consists in that there is no buffer 13, so that the outputs of the shift register 11 are directly connected to the rows of the matrix 12, and that a device 17 is interposed between the outputs of the delay line 10 and the columns of the matrix 12.

Device 17 is composed of 416 memory cells (as many as outputs of the delay line 10), that is, it is a latch with 416 analogue cells, and receives at a special input the change-over pulse I which is conducted in parallel to all the cells.

Pulse I allows device 17 to charge itself with the effective information contained in one line (during the blanking interval), picking it up from the delay line 10 into which it has been introduced, and to supply said information to the elements of one row of the matrix 12 during the remaining part of the line period, that is, during the scanning or effective period of the line.

Such effective period is of about 52 microseconds, that is, four times as long as the blanking interval, so that in the device shown in FIG. 2, the elements of the matrix 12 can remain lit for a longer time than in the device in FIG. 1 and this allows an image brightness proportionately greater with the same pilot current.

Finally, it is clear that variations can be made to the embodiments described hereinabove without, however, departing from the scope of the present invention.

What I claim is:

1. An image display device, comprising a plurality of elements which can be made luminous, arranged in a matrix formed by rows and columns, in which each column of the matrix is piloted by as many outputs of a single delay line of the charge displacement type, which delay line is fed by a video signal representative, for lines, of the image to be reproduced, and by a clock signal, the delay of said line being substantially equal to the effective duration of information in one line of said video signal, and there being provided means for interrupting the passage of the clock signal to said delay line for a time which substantially corresponds to the line blanking interval of said video signal, so that during said time the status of the charges in said delay line remains unchanged, said unchanged charge status being utilized to render luminous a row of said elements.

2. The device of claim 1, wherein said unchanged charge status is utilized to render luminous said row for the duration of said line blanking interval.

3. The device of claim 1, wherein each row of the matrix is piloted by as many outputs of a shift register, said shift register receiving a pulse signal which is repeated at vertical scanning frequency of said matrix and with a duration not longer than one scanning line of the video signal, and a clock signal at line repetition frequency.

4. The device of claim 3, wherein there is comprised change-over means for establishing the connection between rows of the matrix and said shift register only for a period of time within the line blanking interval of said video signal.

5. The device of claim 4, wherein said change-over means comprise a plurality of logic AND gates arranged between the outputs of said shift register and the rows of said matrix.

6. The device of claim 4, wherein at said means for interrupting the passage of the clock signal to said delay line, and at said change-over means there arrive control signals at line frequency and having such a duration and phase that they correspond to the line blanking interval of said video signal.

7. The image display device of claim 1, wherein the outputs of said delay line are connected to a memory device having a plurality of cells one for each output of the delay line, the memory device being fed with a control signal, synchronized with the video signal fed to the delay line and operating to control the feeding of the output signals from the delay line to the memory device during each line blanking interval of the video signal, the memory device then feeding the signals to the columns of the matrix during at least a part of the scanning period of one of the next lines.

8. The device of claim 7, wherein said control signal is at line frequency, arrives at said memory device, and arrives also at said means for interrupting the passage of the clock signal to said delay line; said control signal having such a duration and phase that it corresponds to the line blanking interval of said video signal.

9. The device of claim 1, wherein said means for interrupting the passage of the clock signal to said delay line comprise a change-over device connected on the path of said clock signal towards said delay line, the opening and the closure of said change-over device being controlled by a control signal.

10. The device of claim 1, wherein the device is included in a television image display apparatus.

* * * * *